April 27, 1926.   
W. H. HODGKISS  
STEAM TRAP  
Filed April 30, 1924

1,582,750

WITNESSES

INVENTOR  
WILLIAM H. HODGKISS.  
BY  
ATTORNEYS

Patented Apr. 27, 1926.

1,582,750

UNITED STATES PATENT OFFICE.

WILLIAM HENRY HODGKISS, OF NEW YORK, N. Y.

STEAM TRAP.

Application filed April 30, 1924. Serial No. 710,016.

*To all whom it may concern:*

Be it known that I, WILLIAM H. HODGKISS, a citizen of the United States, and a resident of the city of New York, borough of Manhattan, in the county and State of New York, have invented a new and Improved Steam Trap, of which the following is a full, clear, and exact description.

This invention has relation to steam traps for the purpose of automatically effecting the removal of condensate or the water of condensation from steam systems.

One of the outstanding objects of the present invention resides in the provision of a steam trap which serves to effect a continuous discharge of the condensate from the system to which it is applied, this being in contradistinction to intermittently operable steam traps whereby wear on the parts due to corrosion caused by the sudden rush of water when the valve is intermittently opened, is minimized.

The invention furthermore contemplates a steam trap in which the outlet therefrom is controlled by an expansible and contractible element operable by the temperature of the condensate for controlling the opening and closing of the outlet.

As a still further object the invention comprehends a steam trap which includes a condensate receptacle formed with an inlet and outlet, the latter being so related to the receptacle as to always maintain a predetermined level of condensate therein which is partially cooled to serve as a means for lowering the temperature of the incoming condensate and contractible means for controlling the outlet is retained in a position relative thereto for permitting of the continuous discharge of condensate.

The invention further resides in the provision of a steam trap which eliminates the use of diaphragms, floats, or gravity actuated devices and all forms of delicate internal or external elements which tend to get out of order and require adjustment or replacement.

As a still further object the invention contemplates a steam trap of the character set forth which is comparatively simple in its construction, inexpensive to manufacture, and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figures 1, 2, 3, 4:
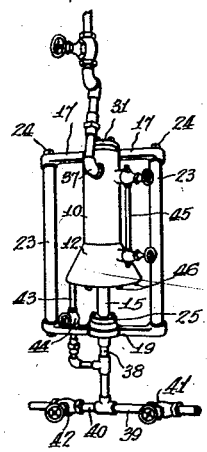
Figure 1 is a perspective view of a steam trap constructed in accordance with the invention.
Fig. 2 is an enlarged vertical sectional view therethrough.
Fig. 3 is a detail vertical sectional view taken approximately on the line indicated at 3—3 in Fig. 2.
Fig. 4 is a horizontal sectional view taken approximately on the line indicated at 4—4 in Fig. 2.

Referring to the drawings by characters of reference, 10 designates the body of a receptacle which receives the condensate through an inlet 11. The lower end of the receptacle body 10 is substantially bell-shaped or flared as at 12 and the bottom 13 thereof is centrally apertured as at 14 to receive the tubular outlet member 15 which passes through a suitable stuffing box 16 for preventing leakage. The upper end of the receptacle body is provided with laterally projecting preferably integral arms 17 which are apertured as at 18 adjacent their free outer ends, the tubular inlet member 15 extends through a cross bar 19, the outer ends of which are apertured as at 20. The member 19 is connected to the arms 17 by rods 21, the opposite ends of which are threaded as at 22 to receive the nuts 24 and the member 19 is spaced from the arms 17 by spacing sleeves 23. The tubular outlet member 15 is threadedly connected to an annular flange 25 which is connected by bolts 26 to the medial portion of the cross member 19. The upper extremity of the tubular outlet member 15 which projects into the receptacle body 10 is provided with a plurality of radial openings 27 constituting outlet ports. The top wall 28 of the receptacle body 10 is provided with a concentric opening 29 disposed in axial alignment with the outlet member 15 and the same receives the boss 30 of a closure cap 31 which is bolted to the top wall 28. The boss 30 of the cap is provided with a central threaded bore 32 extending upwardly from its lower end and receives the threaded upper end 33 of a rod 34, the co-efficient of expansion of which is greater than that of the tubular outlet member 15 or the receptacle body 10. The lower end of the rod 34 is provided with an enlarged head 35 which projects into the upper end of the tubular outlet member 15 and the extreme lower end of the head 35 is tapered or conical as at 36 in order to act as a baffle to deflect the condensate downwardly as the same discharges through the outlet ports 27. The tapered portion 36 also acts as a sealing means as well as a deflecting means for it will be noted that the tapered portion seats on the valve seat when the rod 34 expands, and thus provides a liquid-tight seal for preventing the flow of condensate from the receptacle body 10 into the outlet pipe 15. The outlet pipe 15 has a conical-shaped seat for receiving the conical-shaped portion 36. The condensate is fed to the receptacle body 10 through a conduit 37 which extends through the inlet 11. The lower end of the outlet member 15 is connected with an outlet conduit pipe 38 which is connected at its lower end to branch pipes 39 and 40 controlled by cut-off valves 41 and 42, one of said pipes leading to the feed tank or condenser and the other to the waste outlet, the said valves 41 and 42 selectively controlling the disposition of the condensate as it is removed. In order to provide means for draining the steam line when it is first turned on or when any great amount of condensate is expected, an auxiliary by-pass outlet pipe 43 extends through the bottom wall 13 and communicates with the bell-shaped lower end 12 of the receptacle body 10, the opposite end of said pipe 43 being in communication with the discharge conduit pipe 38. A valve 44 is arranged in the pipe 43 for the purpose of cutting off or opening the pipe 43 to establish communication between the receptacle and the pipe 38. The by-pass pipe 43 will be especially useful to relieve the steam line of the water of condensation which collects more rapidly than the trap capacity can handle will be found expedient when cutting in boilers. In order to observe the level of the water of condensation within the receptacle body 10, a gage 45 is mounted on one side of the body. In order to drain the bell-shaped lower end of the receptacle body and to blow out any dirt or scum which is gathered in the same removable plugs 46 are threadedly engaged in the blow out openings 47.

In use and operation of the device the rod 34 is normally contracted an appropriate degree by the temperature of the condensate to precisely uncover the discharge openings 27 and is maintained in this relative position so long as the condensate continues to be fed to the receptacle body 10 in a sufficient quantity to keep the outlet openings 27 below the condensate level. This renders the condensate removal continuous under such condition but in the event of reduction in the supply of condensate so that the level falls to a point where direct communication between the inlet and outlet member is established, the increase in temperature will expand the rod sufficient to cause its head 35 to cover the outlet openings 27 until the condensate level rises to a point where its temperature is reduced, causing a contraction of the rod to again open the outlets 27. It should be further noted that the device operates with equal facility and precision on high or low temperatures or high or low steam pressures.

In order to set the device for proper operation, it is necessary that the ports 27 in the outlet member 15 be set relatively to the head 35 of the expansible and contractible rod 34 so that the lower end of the head just closes the ports when said rod is fully expanded and so that the lower end of the head just opens the ports 27 when the rod is contracted. This adjustment is accomplished by placing a shim 48 of the required thickness between the flange 25 and the cross member 19. The required thickness of the shim can be determined by heating or drawing steam through the trap until the rod 34 is fully expanded and then raising the flange 25 up until the ports in the tube shut off the steam. It thus follows that the distance between the flange 25 and the cross member 19 is the thickness required for the shim. The device now being set for operation, the setting can be adjusted finer, if boiling water is desired to be delivered, by reducing the thickness of the shim so as to draw down the ports 27 in the tube 15 away from the end of the expanding rod. If it is desired to deliver cooler water, the shims will be thicker to move the tube up relatively to the head 35. The particular shape of the body of the trap with the enlarged or flared bell-shaped bottom contributes greatly to the working efficiency in that it allows a sufficient amount of water to always remain in the receptacle body to act as a sufficient medium for cooling the incoming condensate. This is essential because of the different temperatures of condensate from various pressures of steam. When the steam fluctuates, the condensate of high pressure steam is of a higher temperature than the condensate of a low pressure steam. The bell or flared bottom of the receptacle body operates to lower the temperature of a high pressure condensate to a point lower than the temperature of the condensate of low pressure steam. When the trap or receptacle body 10 is filled with water, the expansible rod 34 contracts under the coolness of the water thereby moving the head 35 upwardly to uncover the outlet ports 27 and to permit the pressure to blow the water through said ports where it is deflected downwardly and carried off by either of the pipes 39 or 40.

From the foregoing it will thus be seen that a steam trap has been provided in which the outlet for the condensate is controlled by the temperature of the condensate and in which when in proper working condition is practically continuous in that the condensate is discharged from the trap in a quantity equal to the amount delivered to the trap.

It will be noted from Figure 1 that the outlet pipe 15 is slidably disposed in the receptacle body 10, and that the pipe is carried by the cross bar 19, which in turn is secured to the arms 17 by the rods 21 and sleeves 23. There is a special purpose for this particular construction. In thermostatic devices, of which I am aware, the thermostatic or expansible and contractible member is secured to the wall of the receptacle which carries the condensate. It will therefore be seen that although the thermostatic member expands and contracts, the wall of the receptacle also expands and contracts, and this expansion and contraction of the wall cuts down the amount of opening obtainable from the expanding and contracting member. In Figure 1, when the body 10 expands or contracts, it slides upon the outlet pipe 15 and therefore the pipe 15 remains in the same place, thus making use of the entire movement of the rod 34 for the opening and closing of the ports 27. Even though the thermostatic member is made of a material having a greater expansion and contraction due to changes in temperature than has the wall of the receptacle, full advantage of the movement of the thermostatic member is not taken unless some means is provided for having the contraction and expansion of the receptacle wall act independently of the movement of the thermostatic member. The construction just described and its operation is a vital feature in the device.

Another feature of the device lies in the means for moving the pipe 15 and the rod 34 with respect to the supporting bases 19 and 17. This construction consists of the shims instead of threaded connections. I have found that the expansion and contraction of the wall surrounding a threaded connection has a tendency to loosen the adjustment, and where the connection is made by fine threads, it takes constant watching and repairing to keep the trap in working condition. This of course is a serious handicap to the device. I have not only mounted the outlet pipe 15 and the rod 34 on independent bases from the wall of the receptacle so as to permit the wall 10 to expand and contract independently of these members. I have also used shims to permit the adjustment of the outlet pipe 15 with respect to the rod 34.

I claim:

1. A steam trap comprising a closed cylindrical receptacle having a bell-shaped bottom end and provided with an inlet for receiving the condensate, a discharge pipe extending axially through said bottom end and having radial discharge ports at its upper end, an expansible and contractible rod depending from the upper end of said receptacle and having its lower end telescopically fitting within the upper ported end of the outlet pipe and operable by the temperature of the condensate to open or close the discharge ports said bell-shaped bottom end spreading the condensate in a thin layer to permit the condensate to be quickly cooled.

2. A steam trap comprising a closed cylindrical receptacle having a bell-shaped bottom end and provided with an inlet for receiving the condensate, a discharge pipe extending axially through said bottom end and having radial discharge ports at its upper end, an expansible and contractible rod depending from the upper end of said receptacle and having its lower end telescopically fitting within the upper ported end of the outlet pipe and operable by the temperature of the condensate to open or close the discharge ports, and baffling means at the lower end of said rod for deflecting downwardly the condensate discharged through the ports said baffling means also providing a liquid tight seal when closing the discharge ports.

3. A steam trap comprising a receptacle having an inlet for receiving the condensate, an outlet pipe communicating with said receptacle, an expansible and contractible rod carried by said receptacle and having its free end slidably disposed in the outlet pipe, said outlet pipe having discharge openings therein adapted to be closed by said rod and having a conical-shaped seat, said rod having a tapered end adapted to contact with said seat to provide a liquid tight seal when said rod is expanded, said rod when expanded also closing the discharge openings, and when contracted positioning said tapered end with respect to the discharge openings so as to have the tapered end act as a baffle for deflecting the condensate into the outlet pipe.

4. A steam trap including a receptacle shaped so as to retain a predetermined amount of condensate therein and to spread the condensate in a thin layer so as to permit the condensate to be quickly cooled, an inlet for said receptacle, an outlet pipe extending upwardly from the bottom of said receptacle and having discharge openings therein that permit the condensate to flow into the outlet pipe when the condensate reaches a predetermined level within the receptacle, a temperature actuated valve for controlling the flow of condensate through said discharge openings, said outlet pipe and said valve being disposed so as to cause the condensate flowing into the receptacle to strike the condensate retained by the receptacle, whereby the temperature of the incoming condensate is quickly lowered.

5. A trap comprising a body portion for receiving a condensate, an outlet pipe slidably carried by the bottom wall of said body portion, whereby the expansion and contraction of said body portion will move said bottom wall of the body portion on said outlet pipe, and an expansible and contractible member for controlling the flow of the condensate through said outlet pipe, said member being carried independently of said bottom wall.

6. A trap comprising a body portion for receiving a condensate, an outlet pipe slidable through the bottom wall of said body portion, whereby the expansion and contraction of said body portion will move the said bottom wall on said outlet pipe, an expansible and contractible member for controlling the flow of the condensate through said outlet pipe, said member being carried independently of said bottom wall, and means for adjusting said outlet pipe and said member with respect to each other to vary the flow of the condensate through the outlet pipe.

WILLIAM HENRY HODGKISS.